United States Patent
Temple

(10) Patent No.: US 10,242,594 B2
(45) Date of Patent: *Mar. 26, 2019

(54) VEHICLE EXTRICATION DOOR SYSTEM

(71) Applicant: FireVent, LLC, Carson City, NV (US)

(72) Inventor: Rodney Gene Temple, Carson City, NV (US)

(73) Assignee: FireVent, LLC, Carson City, NV (US)

( * ) Notice: Subject to any disclaimer, the term of this patent is extended or adjusted under 35 U.S.C. 154(b) by 75 days.

This patent is subject to a terminal disclaimer.

(21) Appl. No.: 15/476,712

(22) Filed: Mar. 31, 2017

(65) Prior Publication Data

US 2017/0206806 A1  Jul. 20, 2017

Related U.S. Application Data

(63) Continuation of application No. 14/732,659, filed on Jun. 5, 2015, now Pat. No. 9,646,515.

(51) Int. Cl.
*C09B 19/00* (2006.01)
*G09B 19/24* (2006.01)
*G09B 25/00* (2006.01)

(52) U.S. Cl.
CPC .............. *G09B 19/24* (2013.01); *G09B 25/00* (2013.01)

(58) Field of Classification Search
USPC .......... 434/219, 226, 247, 258; 49/381, 394, 49/504; 292/163, 219, 240, 241, 261
See application file for complete search history.

(56) References Cited

U.S. PATENT DOCUMENTS

| | | | |
|---|---|---|---|
| 7,789,666 B2 | 9/2010 | Sovine et al. | |
| 7,972,139 B2 | 7/2011 | Staub | |
| 8,167,621 B2 | 5/2012 | Allen | |
| 8,197,257 B2 | 6/2012 | Clewis | |
| 8,408,917 B2 | 4/2013 | Perrone | |
| 8,419,435 B2 | 4/2013 | Perrone | |
| 8,439,685 B2 | 5/2013 | Shelley | |
| 8,485,825 B2 | 7/2013 | Walker | |
| 2010/0019546 A1 | 1/2010 | Stephens | |
| 2015/0037767 A1 | 2/2015 | Britton | |
| 2016/0042655 A1 | 2/2016 | Sweet et al. | |

OTHER PUBLICATIONS

Screenshots of YouTube video showing images of "The AFTS Reusable Class 'A' Burn Vehicle Extrication Prop" manufactured by American Fire Training Systems, Inc.; Apr. 14, 2012, https://www.youtube.com/watch?v=1riUdTA965o.

*Primary Examiner* — Kurt Fernstrom

(74) *Attorney, Agent, or Firm* — Glass & Associates; Kenneth D'Alessandro; Kenneth Glass

(57) ABSTRACT

A vehicle extrication door system that is a training simulator used to simulate opening the door of a vehicle that has been involved in an accident. The system comprises two supports, two consumable pieces, a first connector, and a compound hinge. Each support can have a proximate end, a distal end, an interior surface and an exterior surface, and each consumable piece can have an opening. The proximate end of the first support supports the first consumable piece, and the proximate end of the second support supports the second consumable piece. The opening of the first consumable piece aligns with the opening of the second consumable piece on the same horizontal axis and the first connector then passes through the openings of the consumable pieces and secures the first consumable piece to the second consumable piece. The first support is moveable between an open and a closed position.

20 Claims, 7 Drawing Sheets

VEHICLE EXTRICATION DOOR SYSTEM

CROSS-REFERENCE TO RELATED APPLICATIONS

This Application is a Continuation of U.S. patent application Ser. No. 14/732,659 titled "Vehicle Extrication System," filed Jun. 5, 2015, the contents of which are incorporated herein by reference in their entirety.

BACKGROUND

Many people are involved in vehicle accidents every year. Typically, when a vehicle is involved in an accident, the doors of the vehicle become damaged and will not open properly. This results in the occupant being restrained in the vehicle and unable to escape. Moreover, an occupant may need medical attention and first responders or rescuers may not be able to readily open the door of the vehicle to access and remove the occupant. Most often, the only way to access and remove the occupant is by forcing the doors of the vehicle open via mechanical means. The most common and effective way to mechanically force open the damaged door of a vehicle is by using hydraulic extrication equipment to spread the door jamb apart at the latching or locking mechanism until the latching or locking mechanism is rendered ineffective and the door is able to be pulled open. Consequently, there is a need for a vehicle extrication door system for use as a training simulator which is capable of providing high repetition, cost-effective and easily reset practice and/or simulation of opening the door of a vehicle that has been involved in an accident.

The present invention overcomes several of the deficiencies, disadvantages and undesired parameters associated with the known vehicle extrication door systems used as training simulators.

SUMMARY

According to one embodiment of the present invention, there is provided a vehicle extrication door system. The system comprises, a) a first support having a first proximate end and a first distal end, an interior surface and an exterior surface, wherein the first proximate end supports a first consumable piece, the first consumable piece further comprising a first opening; b) a second support having a second proximate end and a second distal end, wherein the second proximate end supports a second consumable piece, the second consumable piece further comprising a second opening, wherein the first opening and the second opening align on the same horizontal axis; c) a first connector which passes through the first opening and the second opening and secures the first consumable piece to the second consumable piece; and d) a compound hinge comprising an interior hinge mechanism and an exterior hinge mechanism, wherein the interior and exterior hinge mechanisms are coupled to each other by a second connector; wherein the first distal end of the first support is coupled to the second distal end of the second support by the compound hinge and the first support is moveable between an open position and a closed position and wherein the first consumable piece and the second consumable piece are removable and replaceable.

In one embodiment, the first connector is a rod. In another embodiment, the rod is a 0.5 inch grade 8 bolt. In another embodiment, the first connector is coupled to a spring proximate the second consumable piece such that the spring allows for some movement of the first consumable piece before the first consumable piece begins to deform. In another embodiment, the first consumable piece comprises light gauge 2 inch by 4 inch steel tubing. In another embodiment, the second consumable piece comprises heavy gauge 2 inch by 4 inch steel tubing. In another embodiment, the first proximate end of the first support is distal to the second proximate end of the second support when the first support is in the open position. In another embodiment, the first proximate end of the first support is proximate to the second proximate end of the second support when the first support is in the closed position. In another embodiment, the system further comprises a sheet of material, wherein the sheet of material is coupled to the exterior surface of the first support. In another embodiment, the first proximate end of the first support further comprises an upper portion and a lower portion. In one embodiment, the upper portion further comprises an upper portion opening and the lower portion further comprises a lower portion opening. In another embodiment, the first consumable piece is inserted from the bottom up, through the lower portion opening and into the upper portion opening, thereby coupling the first consumable piece to the first proximate end of the first support. In another embodiment, the second consumable piece is coupled to the second proximate end of the second support by at least one bolt. In another embodiment, the system further comprises a third consumable piece coupled to the first interior surface of the distal end of the first support and the second interior surface of the second distal end of the second support. In another embodiment, the system further comprises a fourth consumable piece coupled to the first interior surface of the distal end of the first support and the second interior surface of the second distal end of the second support.

According to another embodiment of the present invention, there is provided a method of using the system. The method comprises, a) activating a hydraulic spreader, wherein the hydraulic spreader comprises two or more spreading surfaces; b) placing the two or more spreading surfaces between the first consumable piece and the second consumable piece; c) spreading the two or more spreading surfaces to deform the first consumable piece such that it removes the first connector from the first opening in the first consumable piece; and d) moving the first support into the open position.

In another embodiment, the method further comprises, a) activating a hydraulic spreader, wherein the hydraulic spreader comprises two or more spreading surfaces; b) placing the two or more spreading surfaces between the first consumable piece and the second consumable piece; c) spreading the two or more spreading surfaces to deform the first consumable piece such that it removes the first connector from the first opening in the first consumable piece; d) moving the first support towards the open position until the third consumable piece prevents the first support from moving any further; e) activating a hydraulic cutter, wherein the hydraulic cutter comprises two or more cutting surfaces; f) placing the two or more cutting surfaces around the third consumable piece; g) closing the two or more cutting surfaces to cut the third consumable piece; and h) moving the first support into the open position.

DRAWINGS

These and other features, aspects and advantages of the present invention will become better understood with regard to the following description, appended claims, and accompanying drawings where:

DESCRIPTION

As used herein, the following terms and variations thereof have the meanings given below, unless a different meaning is clearly intended by the contest in which such term is used.

The terms "a," "an," and "the" and similar referents used herein are to be construed to cover both the singular and the plural unless their usage in context indicates otherwise.

As used in this disclosure, the term "comprise" and variations of the term, such as "comprising" and "comprises," are not intended to exclude other additives, components, integers ingredients or steps.

Figure 1:
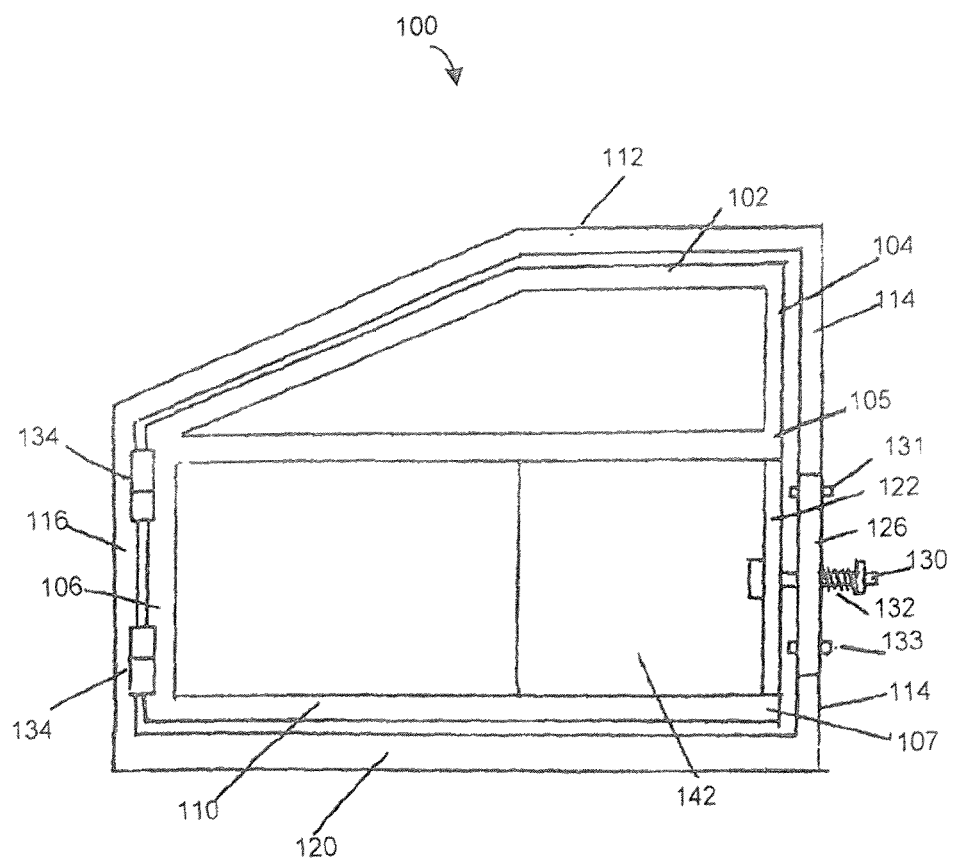
FIG. 1 is a front elevation view of a vehicle extrication door system according to the present invention.
Figure 2:
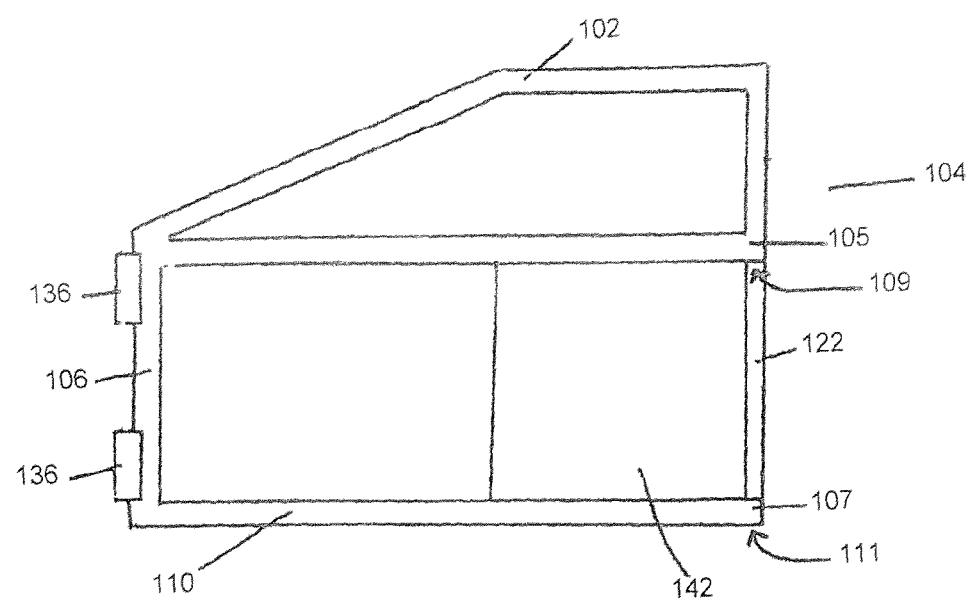
FIG. 2 is a front elevation view of a first support of a vehicle extrication door system according to the present invention.
Figure 3:
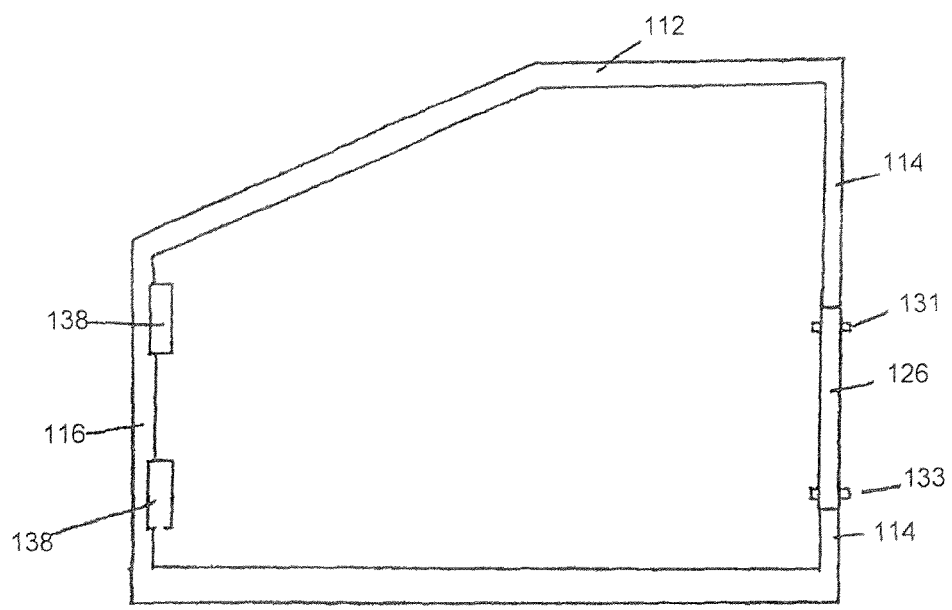
FIG. 3 is a front elevation view of a second support of a vehicle extrication door system according to the present invention.

Referring now to FIGS. 1-3, a vehicle extrication door system 100 is a training simulator that is used to practice or simulate opening the door of a vehicle that has been involved in an accident. The vehicle extrication door system 100 can comprise a first support 102, a second support 112, a first consumable piece 122, a second consumable piece 126, a first connector 130, and a compound hinge 134. The first support 102 can have a first proximate end 104, a first distal end 106, a first interior surface 108 and a first exterior surface 110. The second support 112 can have a second proximate end 114, a second distal end 116, a second interior surface 118 and a second exterior surface 120. The first consumable piece 122 has a first opening 124 and the second consumable piece 126 has a second opening 128. The first proximate end 104 of the first support 102 supports the first consumable piece 122, and the second proximate end 114 of the second support 112 supports the second consumable piece 126. The first opening 124 of the first consumable piece 122 aligns with the second opening 128 of the second consumable piece 126 on the same horizontal axis. The first connector 130 then passes through the first opening 124 of the first consumable piece 122 and the second opening 128 of the second consumable piece 126 and secures the first consumable piece 122 to the second consumable piece 126. The first exterior surface 110 and the second exterior surface 120 face the user when the vehicle extrication door system 100 is in use. Moreover, the first consumable piece 122 and the second consumable piece 126 are removable and replaceable, making the vehicle extrication door system 100 easy to reset and capable of repetitive use. The vehicle extrication door system 100 can be used with any hydraulic extrication tools, including but not limited to hydraulic spreaders and hydraulic cutters.

The first support 102, the second support 112, the first consumable piece 122, and the second consumable piece 126 are preferably made from metal. Optionally, the first consumable piece 122 can comprise light gauge 2 inch by 4 inch steel tubing and the second consumable piece 126 can comprise heavy gauge 2 inch by 4 inch steel tubing. All of the force of the hydraulic spreaders is placed on the first consumable piece 122. As such, the material selected for the first consumable piece 122 is selected so that it will deform when placed under pressure from the hydraulic spreaders. Conversely, the material selected for the second consumable piece 126 is selected so that it will not deform when placed under pressure. Thus, the vehicle extrication door system 100 behaves as a typical vehicle door would when hydraulic spreaders are applied.

Additionally, the first connector 130 is used to mimic the "nader pin" or locking latch typically found in vehicle doors. When hydraulic spreaders are applied to a typical vehicle door, the door jamb of the vehicle deforms and tears around the nader pin which is secured to the frame of the vehicle and extends into the vehicle door. In the present invention, the first consumable piece 122 deforms and tears around the first connector 130, providing the same experience a user would have if they were using the hydraulic spreaders on a real vehicle door. The first consumable piece 122 is the only part of the vehicle extrication door system 100 that deforms when the vehicle extrication door system 100 is being used for training.

In one embodiment of the present invention, the first proximate end 104 of the first support 102 can comprise an upper portion 105 and a lower portion 107. Additionally, the upper portion 105 can comprise an upper portion opening 109. Furthermore, the lower portion 107 can comprise a lower portion opening 111. The upper portion opening 109 and the lower portion opening 111 are sized such that the first consumable piece 122 will be able to slide through the lower portion opening 111 and up into the upper portion opening 109.

Neither the first consumable piece 122 nor the second consumable piece 126 are permanently coupled to the first and second supports 102, 112, respectively. In order to couple the first consumable piece 122 to the first proximate end 104 of the first support 102, the first support 102 must be moved to the open position. Then, the first consumable piece 122 can be inserted from the bottom up, through the lower portion opening 111 and into the upper portion opening 109 which are positioned on the first proximate end 104 of the first support 102. Once the first consumable piece 122 has been inserted, the first support 102 can then be moved back to the closed position, which brings the first consumable piece 122 into proximity with the second consumable piece 126. In order to fully secure the first consumable piece 122 to the first proximate end 104 of the first support 102, the first connector 130 must be inserted through the first opening 124 and the second opening 128, thereby preventing any significant movement of the first consumable piece 122.

The second consumable piece 126 is coupled to the second proximate end 114 of the second support 112 by at least one bolt 131. Optionally, the second consumable piece 126 is coupled to the second proximate end 114 of the second support 112 by a second bolt 133. As such, the first consumable piece 122 can be easily removed after use, and replaced with a non-deformed consumable piece, making the vehicle extrication door system 100 a high repetition, cost effective, and easily reset training tool. Moreover, even though the second consumable piece 126 can be removed and replaced as needed, it will not be necessary to do so after each use, and the second consumable piece 126 can be used numerous times before it does need to be replaced.

Optionally, the first connector 130 which secures the first consumable piece 122 to the second consumable piece 126 can be a rod, or it can be a 0.5 inch grade 8 bolt. Moreover, the first connector 130 will not need to be replaced after each use, and can be used numerous times before it does need to be replaced. Additionally, the first connector 130 can be coupled to a spring 132 which is proximate to the second consumable piece 126 such that the spring 132 will depress and allow some movement of the first consumable piece 122 before the first consumable piece 122 begins to deform. The spring 132 can be a heavy duty "die spring." The addition of the spring 132 to the vehicle extrication door system 100 causes the first consumable piece 122 to have more movement. The greater range of movement requires the user to work harder or manipulate the hydraulic spreaders more effectively in order to be able to move the first support 102 from the closed position to the open position. Thus, it provides varying degrees of difficulty, which is something often encountered by a rescuer out in the field.

Additionally, when the first support 102 is in the closed position, the first proximate end 104 of the first support 102 is proximate to the second proximate end 114 of the second support 112. Furthermore, when the first support 102 is in the open position, the first proximate end 104 of the first support 102 is distal to the second proximate end 114 of the second support 112. The first support 102 moves from the closed position to the open position via the compound hinge 134.

Optionally, there can be a sheet of material 142 which can be coupled to the first exterior surface 110 of the first support 102. The purpose of the sheet of material 142 is to mimic the "outside skin" of an actual vehicle door. In the event that the sheet of material 142 is coupled to the first exterior surface 110 of the first support 102 when the vehicle extrication door system 100 is used, the sheet of material 142 will have to be replaced after use because the sheet of material 142 will crumple/crush during use just as the outside skin of an actual vehicle door would. The sheet of material 142 can be any material, but preferably a light gauge sheet metal. Optionally, the sheet of material 142 can be coupled to the first exterior surface 110 of the first support 102 by being slid into place via perimeter tracks which run down the first exterior surface 110 of the first proximate end 104 and the first distal end 106 of the first support 102. Once the sheet of material 142 has been slid into the tracks, it can then be held into place by self-tapping screws.

The second support 112 can be secured to an existing trailer frame, making the vehicle extrication door system 100 easy to transport. Once the second support 112 has been secured to an existing trailer frame, the first support 102 can be coupled to the second support 112, preferably by the compound hinge 134 located at the first distal end 106 of the first support 102 and the second distal end 116 of the second support 112. Once the first support 102 has been coupled to the second support 112, the first consumable piece 122 can be coupled to the first proximate end 104 of the first support 102 and the second consumable piece 126 can be coupled to the second proximate end 114 of the second support 112. The first support 102 can then be moved to the closed position, which would then align the first opening 124 and the second opening 128 of the first consumable piece 122 and the second consumable piece 126 along the same horizontal axis. Once the first opening 124 and the second opening 128 are aligned, the first connector 130 can be inserted through the first opening 124 and the second opening 128, securing the first consumable piece 122 to the second consumable piece 126. Optionally, a spring 132 can be secured to the first connector 130 which is proximate to the second consumable piece 126. Optionally, a sheet of material 142 can be secured to the first exterior surface 110 of the first support 102.

Figure 4:
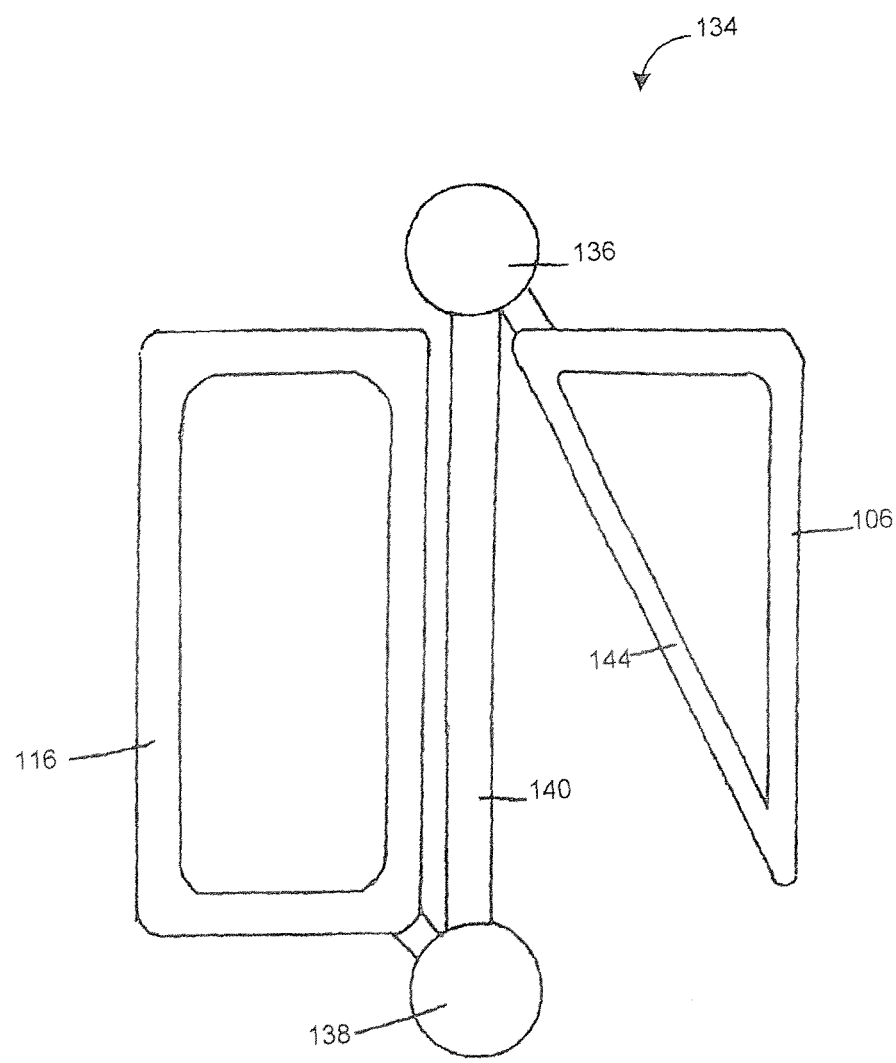
FIG. 4 is a top plan view of a compound hinge of a vehicle extrication door system according to the present invention.

Referring now to FIG. 4, the compound hinge 134 comprises an interior hinge mechanism 136 and an exterior hinge mechanism 138 coupled to each other by a second connector 140. The interior hinge mechanism 136 is located on the first interior surface 108 of the first support 102 and the second interior surface 118 of the second support 112. The exterior hinge mechanism 138 is located on the first exterior surface 110 of the first support 102 and the second exterior surface 120 of the second support 112. The first distal end 106 of the first support 102 is coupled to the second distal end 116 of the second support 112 by the compound hinge 134, and the first support 102 is moveable between an open position and a closed position. Optionally, the first distal end 106 of the first support 102 is coupled to the interior hinge mechanism 136, and the second distal end 116 of the second support 112 is coupled to the exterior hinge mechanism 138. Additionally, the first distal end 106 of the first support 102 has an angled side 144 facing the second distal end 116 of the second support 112. The angled side 144 allows the first proximate end 104 of the first support 102 to swing clear of the second proximate end 114 of the second support 112 via the compound hinge 134. If the first distal end 106 of the first support 102 is not angled, the first proximate end 104 of the first support 102 is unable to swing clear of the second proximate end 114 of the second support 112.

When in use, the interior hinge mechanism 136 begins to pivot first. When the first support 102 pivots on the interior hinge mechanism 136, the interior hinge mechanism 136 allows the first proximate end 104 of the first support 102 to swing clear of the second proximate end 114 of the second support 112. Once the first proximate end 104 of the first support 102 has swung clear of the second proximate end 114 of the second support 112, the exterior hinge mechanism 138 takes over, and the first support 102 can then be moved from the closed position to the open position.

Figure 5:
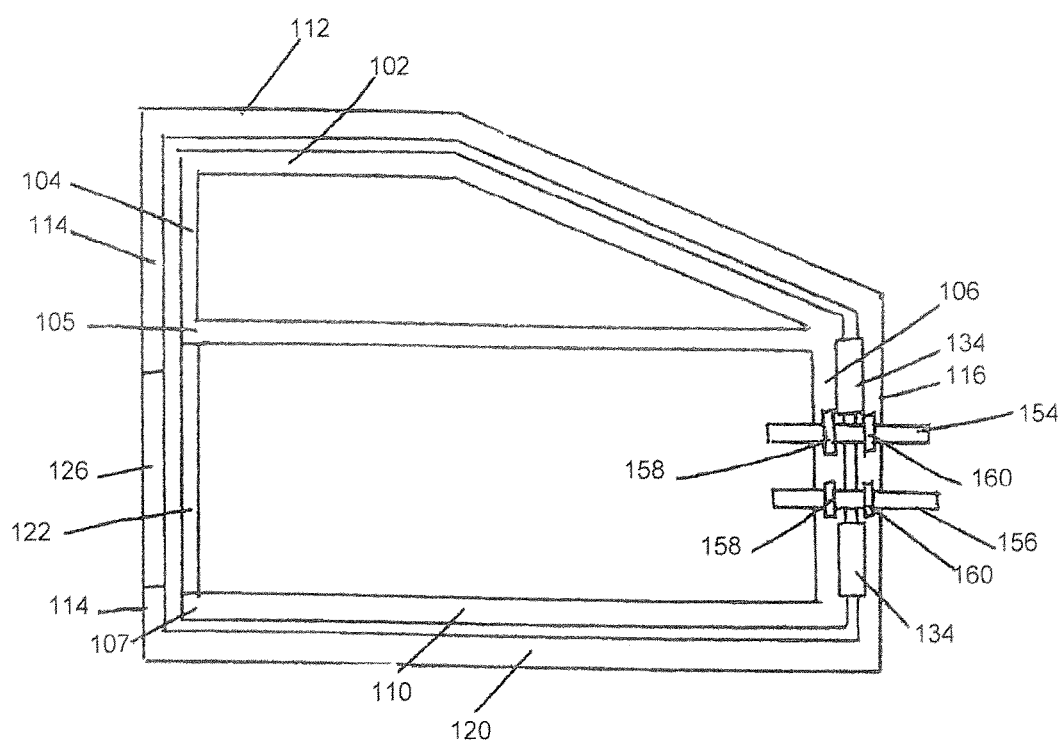
FIG. 5 is rear elevation view of a vehicle extrication door system according to the present invention.

Referring now to FIG. 5, in another embodiment of the present invention, there is a third consumable piece 154 coupled to the first interior surface 108 of the first distal end 106 of the first support 102 and the second interior surface 118 of the second distal end 116 of the second support 112. Optionally, there can be a fourth consumable piece 156 coupled to the first interior surface 108 of the first distal end 106 of the first support 102 and the second interior surface 118 of the second distal end 116 of the second support 112. There can also be first and second circular supports 158, 160 permanently coupled to the interior surfaces 108, 118, such that the third consumable piece 154 is inserted through the first and second circular supports 158, 160. Optionally, there can be a second set of first and second circular supports 158, 160 supporting the fourth consumable piece 156. Additionally, the third consumable piece 154 and the fourth consumable piece 156 can be made of rebar.

When the first support 102 is moved from the closed position to the open position, the first and second circular supports 158, 160 are permitted to move along the third consumable piece 154, allowing some movement of the first support 102. If the third consumable piece 154 is not coupled to the vehicle extrication door system 100, then the first support 102 can rotate at least 180°, from the closed position to the open position. However, when the third consumable piece 154 is in place, the positioning of the third consumable piece 154 does not permit the first support 102 to swing open a full 180°. This is desirable because the lack of movement of the first support 102 mimics the real-life situation wherein the hinges of a vehicle door will not open any further. In a true emergency, there can be the need for the first responders or rescuers to cut the hinges of the vehicle door, to fully remove the door from the vehicle and allow the responders to gain access to the occupant. Thus, when a user is using the vehicle extrication door system 100, and the first support 102 will not move to a fully open position due to the presence of the third consumable piece 154, the user is required to switch from the hydraulic spreaders to hydraulic cutters, and must cut the third consumable piece 154 (and possibly a fourth consumable piece 156, if both are used on the system), mimicking cutting the hinges of a vehicle door.

Figure 6:
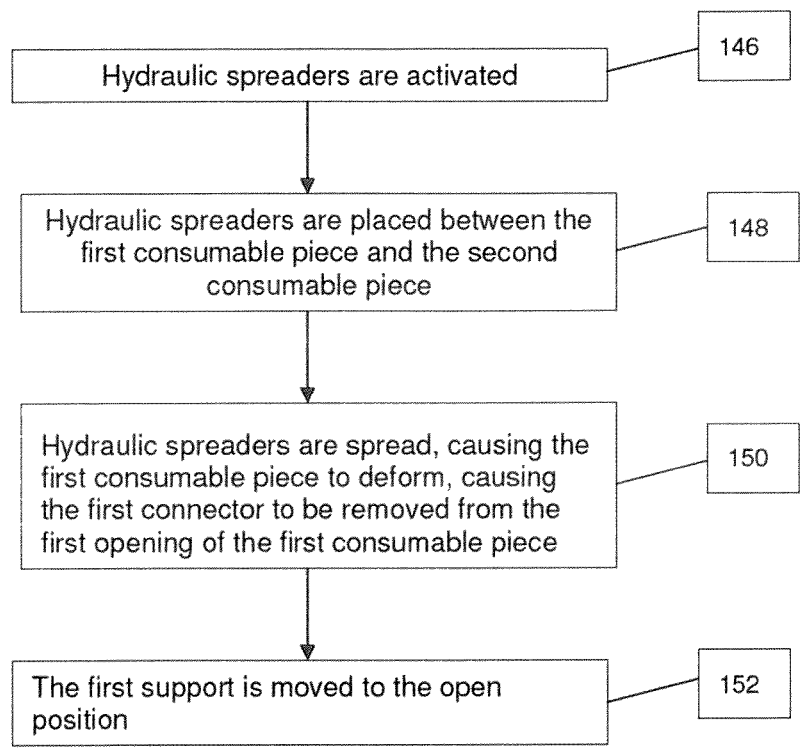
FIG. 6 is a flow chart diagram of a first method of using the vehicle extrication door system according to the present invention.

Referring now to FIG. 6, a method of using the vehicle extrication door system 100 of the present invention comprises the steps of activating 146 a hydraulic spreader (not shown), wherein the hydraulic spreader comprises two or more spreading surfaces, placing 148 the two more spreading surfaces between the first consumable piece 122 and the second consumable piece 126, spreading 150 the hydraulic spreader to deform the first consumable piece 122 such that it removes the first connector 130 from the first opening 124 in the first consumable piece 122, and then moving 152 the first support 102 into the open position.

Figure 7:
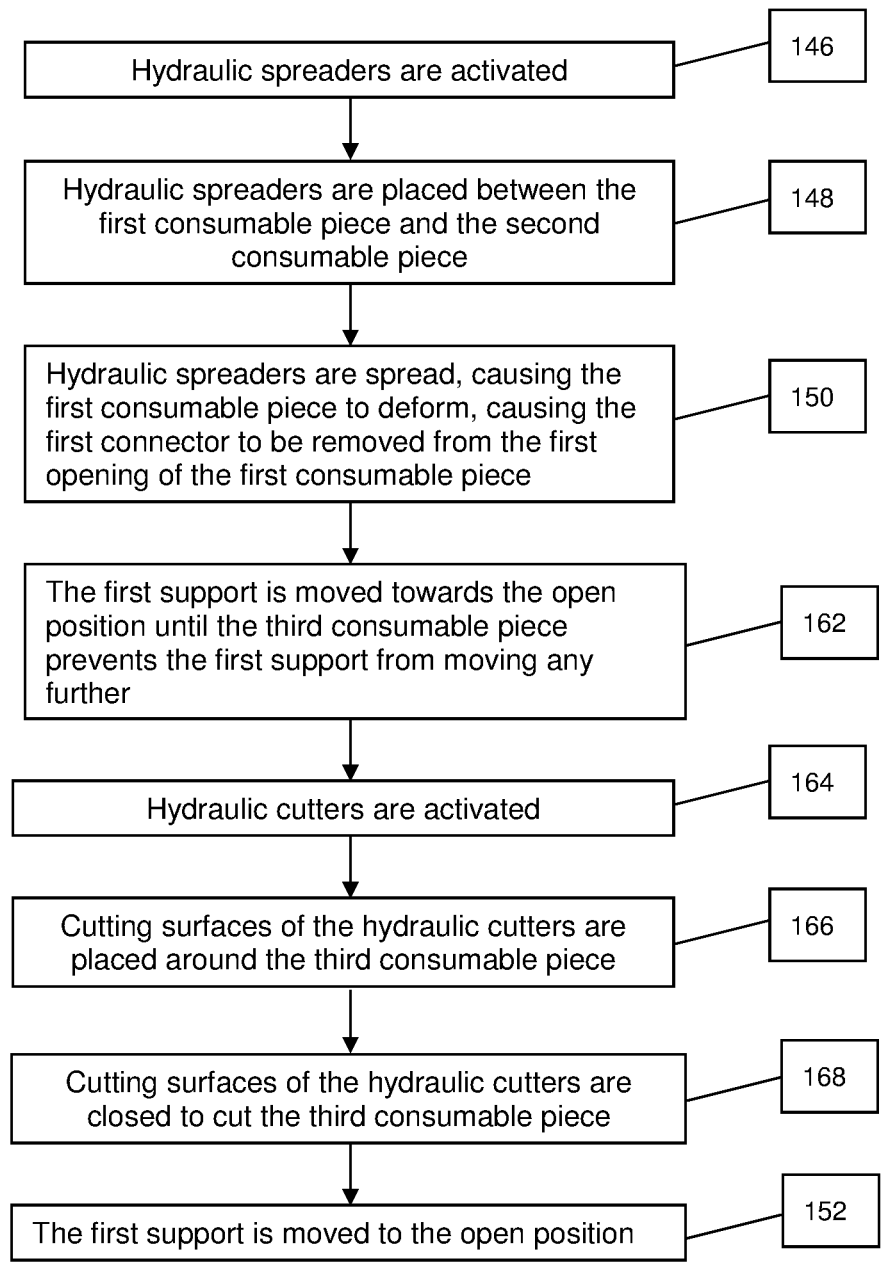
FIG. 7 is a flow chart diagram of a second method of using the vehicle extrication door system according to the present invention.

Referring now to FIG. 7, a method of using the vehicle extrication door system 100 of the present invention wherein the vehicle extrication door system 100 further comprises a third consumable piece 154. The method comprises the steps of activating 146 a hydraulic spreader (not shown), wherein the hydraulic spreader comprises two or more spreading surfaces, placing 148 the two or more spreading surfaces between the first consumable piece 122 and the second consumable piece 126, spreading 150 the hydraulic spreader to deform the first consumable piece 122 such that it removes the first connector 130 from the first opening 124 in the first consumable piece 122, moving 162 the first support 102 towards the open position until the third consumable piece 154 prevents the first support 102 from moving any further, activating 164 a hydraulic cutter (not shown), wherein the hydraulic cutter comprises two or more cutting surfaces, placing 166 the two or more cutting surfaces around the third consumable piece 154, closing 168 the two or more cutting surfaces of the hydraulic cutter to cut the third consumable piece 154, and moving 152 the first support 102 to the open position.

Although the present invention has been described in considerable detail with reference to certain preferred embodiments, other embodiments are possible. The steps disclosed for the present methods, for example, are not intended to be limiting nor are they intended to indicate that each step is necessarily essential to the method, but instead are exemplary steps only. Therefore, the scope of the appended claims should not be limited to the description of preferred embodiments contained in this disclosure. All references cited herein are incorporated by reference in their entirety.

What is claimed is:

1. A vehicle extrication door system, the system comprising:
    a first support having a first proximate end and a first distal end an interior surface and an exterior surface, wherein the first proximate end is configured to support a first consumable piece;
    a second support having a second proximate end and a second distal end wherein the second proximate end is configured to support a second consumable piece; and
    a hinge comprising an interior hinge mechanism and an exterior hinge mechanism, wherein the interior and exterior hinge mechanisms are coupled to each other by a first connector;
    wherein the first distal end of the first support is coupled to the second distal end of the second support by the hinge and the first support is moveable between an open position and a closed position.

2. The system of claim 1, further comprising the first consumable piece and the second consumable piece, and wherein the first consumable piece comprises a first opening and the second consumable piece comprises a second opening, and the first opening and the second opening align on the same horizontal axis.

3. The system of claim 2, wherein the first consumable piece and the second consumable piece are removable and replaceable.

4. The system of claim 2, further comprising a second connector which passes through the first opening and the second opening and secures the first consumable piece to the second consumable piece.

5. The system of claim 4, wherein the second connector is a rod.

6. The system of claim 5, wherein the rod is a 0.5 inch grade 8 bolt.

7. The system of claim 4, wherein the second connector is coupled to a spring proximate the second consumable piece such that the spring allows for some movement of the first consumable piece before the first consumable piece begins to deform.

8. The system of claim 2, wherein the first consumable piece comprises light gauge 2 inch by 4 inch steel tubing.

9. The system of claim 2, wherein the second consumable piece comprises heavy gauge 2 inch by 4 inch steel tubing.

10. The system of claim 1, wherein the first proximate end of the first support is distal to the second proximate end of the second support when the first support is in the open position.

11. The system of claim 1, wherein the first proximate end of the first support is proximate to the second proximate end of the second support when the first support is in the closed position.

12. The system of claim 1, further comprising a sheet of material, wherein the sheet of material is coupled to the exterior surface of the first support.

13. The system of claim 1, wherein the first proximate end of the first support further comprises an upper portion and a lower portion.

14. The system of claim 13, wherein the upper portion further comprises an upper portion opening and the lower portion further comprises a lower portion opening.

15. The system of claim 14, wherein the first consumable piece is inserted from the bottom up through the lower portion opening and into the upper portion opening, thereby coupling the first consumable piece to the first proximate end of the first support.

16. The system of claim 2, wherein the second consumable piece is coupled to the second proximate end of the second support by at least one bolt.

17. The system of claim 2, further comprising a third consumable piece coupled to the first interior surface of the distal end of the first support and the second interior surface of the second distal end of the second support.

18. The system of claim 17, further comprising a fourth consumable piece coupled to the first interior surface of the distal end of the first support and the second interior surface of the second distal end of the second support.

19. A method of using the system of claim 2, the method comprising the steps of:
   a) activating a hydraulic spreader, wherein the hydraulic spreader comprises two or more spreading surfaces;
   b) placing the two or more spreading surfaces between the first consumable piece and the second consumable piece;
   c) spreading the two or more spreading surfaces to deform the first consumable piece such that it removes the first connector from the first opening in the first consumable piece; and
   d) moving the first support into the open position.

20. A method of using the system of claim 17, the method comprising the steps of:
   a) activating a hydraulic spreader, wherein the hydraulic spreader comprises two or more spreading surfaces;
   b) placing the two or more spreading surfaces between the first consumable piece and the second consumable piece;
   c) spreading the two or more spreading surfaces to deform the first consumable piece such that it removes the first connector from the first opening in the first consumable piece;
   d) moving the first support towards the open position until the third consumable piece prevents the first support from moving any further;
   e) activating a hydraulic cutter, wherein the hydraulic cutter comprises two or more cutting surfaces;
   f) placing the two or more cutting surfaces around the third consumable piece;
   g) closing the two or more cutting surfaces to cut the third consumable piece; and
   h) moving the first support into the open position.

\* \* \* \* \*